United States Patent [19]

Lyshkov

[11] Patent Number: 5,484,090
[45] Date of Patent: Jan. 16, 1996

[54] FRAMED PANNIER AND MOUNTING ARRANGEMENT FOR REAR CARRIER BICYCLE RACKS

[76] Inventor: Leslie Lyshkov, 608 S. Glendora Ave., Apt. #D, W. Covina, Calif. 91790

[21] Appl. No.: 899,640

[22] Filed: Jun. 16, 1992

[51] Int. Cl.$^6$ .................................................. B62J 9/00
[52] U.S. Cl. ........................ 224/40; 224/32 A; 224/33 R
[58] Field of Search ............................ 224/32 A, 32 R, 224/33 R, 33 A, 37, 38, 40, 39, 30 R

[56] References Cited

U.S. PATENT DOCUMENTS

| | | | |
|---|---|---|---|
| 545,551 | 9/1895 | Tanquary. | |
| 582,173 | 5/1897 | Buckley. | |
| 624,669 | 5/1899 | Moore. | |
| 1,214,761 | 2/1917 | Craig. | |
| 2,539,381 | 1/1951 | Bachmann | 224/32 |
| 2,675,151 | 4/1954 | Herbert | 224/30 |
| 2,778,554 | 1/1957 | Porkola | 224/42.46 |
| 2,890,819 | 6/1959 | Glenny | 224/32 |
| 2,894,708 | 7/1959 | Kaplan | 248/99 |
| 3,145,408 | 8/1964 | Hertzel et al. | 15/257 |
| 3,155,346 | 11/1964 | Montgomery | 248/99 |
| 3,157,327 | 11/1964 | Karbin | 224/30 |
| 3,323,714 | 6/1967 | Lewis | 232/43.2 |
| 3,386,444 | 6/1968 | Brenner et al. | 128/292 |
| 3,716,938 | 2/1973 | Ammons | 43/55 |
| 3,786,972 | 1/1974 | Alley | 224/31 |
| 3,802,620 | 4/1974 | Ferrara | 232/19 |
| 3,853,253 | 12/1974 | Hawkins et al. | 224/39 |
| 3,874,574 | 4/1975 | Heise | 224/31 |

(List continued on next page.)

FOREIGN PATENT DOCUMENTS

| | | | |
|---|---|---|---|
| 980045 | 5/1951 | France | 224/32 R |
| 1013732 | 8/1952 | France | 224/32 R |
| 1090075 | 3/1955 | France | 224/32 R |
| 1102369 | 10/1955 | France | 224/32 R |
| 730586 | 5/1955 | United Kingdom | 224/32 A |
| 734278 | 7/1955 | United Kingdom | 224/32 A |

OTHER PUBLICATIONS

'Nashbar Townies', Bike Nashbar, 4111 Simon Rd., Youngstown, Ohio 44512 Tel: (216) 782–2244.
'City Basket', Bike Pro USA, 3701 West Roanoke, Suite A, Phoenix, Ariz. 85009 Tel: (602) 272–3588.
'Novara Round–Town Basket', Recreational Equipment Inc., Sumner, Wash. 98352–0001, Tel: 800–426–4840.
'Grabbasket (GB–1500)', Blackburn Design, 1510 Dell Ave., Campbell, Calif. 95008, Tel: 800–776–5677.
'Grocery Bag Pannier', Jandd Mountaineering, 511 East Gutierrez #2, Santa Barbara, Calif. 93103 Tel: 805–564–2044.
'Mountain Pannier', Jandd Mountaineering, 511 East, Gutierrez, #2, Santa Barbara, Calif. 93103 Tel: 800–564–2044.
'Mini Mountain Pannier', Jandd Mountaineering, 511 East Gutierrez #2, Santa Barbara, Calif. 93103 Tel: 805–564–2044.
Blue Snake Cycle Works, 1021 S. Glendora Ave., Suite 217 W. Covina, Calif. 91790: Order Form, Instructions & Expo Info.

*Primary Examiner*—Linda J. Sholl

[57] ABSTRACT

A foldable, detachable, open-top bicycle pannier having a back panel (38) reinforced by a skeleton frame (50) and a bottom panel (36) supported along its forward reach by two strut wires (44) and a horizontal beam (50). An integral plastic hinge (48) joins both panels along a common edge. The skeleton frame (50) connects both strut wire attachment points (52); both top hook mounts (32); and a bottom mount, which, in one embodiment, comprises a short elastic loop (34). A hinged U-shaped rod (40) joined to the back panel (38) holds the top of the pannier open, but bears no weight from its load. A convertable cover (64) can either extend across the top opening of the pannier or stows away inside it. A spring-loaded hook device attached to the skeleton frame (50) comprises an alternate embodiment to the short elastic loop (34), the device consisting of: a slider (76), two slider guide brackets (78), a compression spring (80), and one or a pair hook blades (82).

1 Claim, 16 Drawing Sheets

U.S. PATENT DOCUMENTS

| | | | |
|---|---|---|---|
| 3,903,944 | 9/1975 | Montgomery et al. | 150/2.7 |
| 3,934,770 | 1/1976 | Larson | 224/33 |
| 3,937,374 | 2/1976 | Hine, Jr. | 224/32 A |
| 3,955,727 | 5/1976 | Montgomery | 224/31 |
| 3,989,174 | 11/1976 | Norinsky | 224/31 |
| 4,062,604 | 12/1977 | Popper | 312/211 |
| 4,151,938 | 5/1979 | Jorjorian et al. | 224/33 R |
| 4,174,795 | 11/1979 | Jackson et al. | 224/32 A |
| 4,244,496 | 1/1981 | Litz | 224/32 R |
| 4,258,870 | 3/1981 | Edelson | 224/32 A |
| 4,262,829 | 4/1981 | Hine, Jr. et al. | 224/32 R |
| 4,271,996 | 6/1981 | Montgomery et al. | 224/32 A |
| 4,295,586 | 10/1981 | Shockley | 224/32 R |
| 4,328,915 | 5/1982 | Melton, III | 224/32 R |
| 4,353,490 | 10/1982 | Jackson et al. | 224/32 A |
| 4,418,850 | 12/1983 | Jackson et al. | 224/32 A |
| 4,516,705 | 5/1985 | Jackson | 224/32 A |
| 4,537,377 | 8/1985 | Shewchuk | 248/99 |
| 4,542,839 | 9/1985 | Levine et al. | 224/36 |
| 4,577,786 | 3/1986 | Dowrick et al. | 224/32 A |
| 4,580,706 | 4/1986 | Jackson et al. | 224/32 A |
| 4,662,548 | 5/1987 | Jackson et al. | 224/32 A |
| 4,664,455 | 5/1987 | Greenhow | 312/211 |
| 4,671,438 | 6/1987 | La Plante | 224/32 A |
| 4,773,573 | 9/1988 | Doveri | 224/32 A |

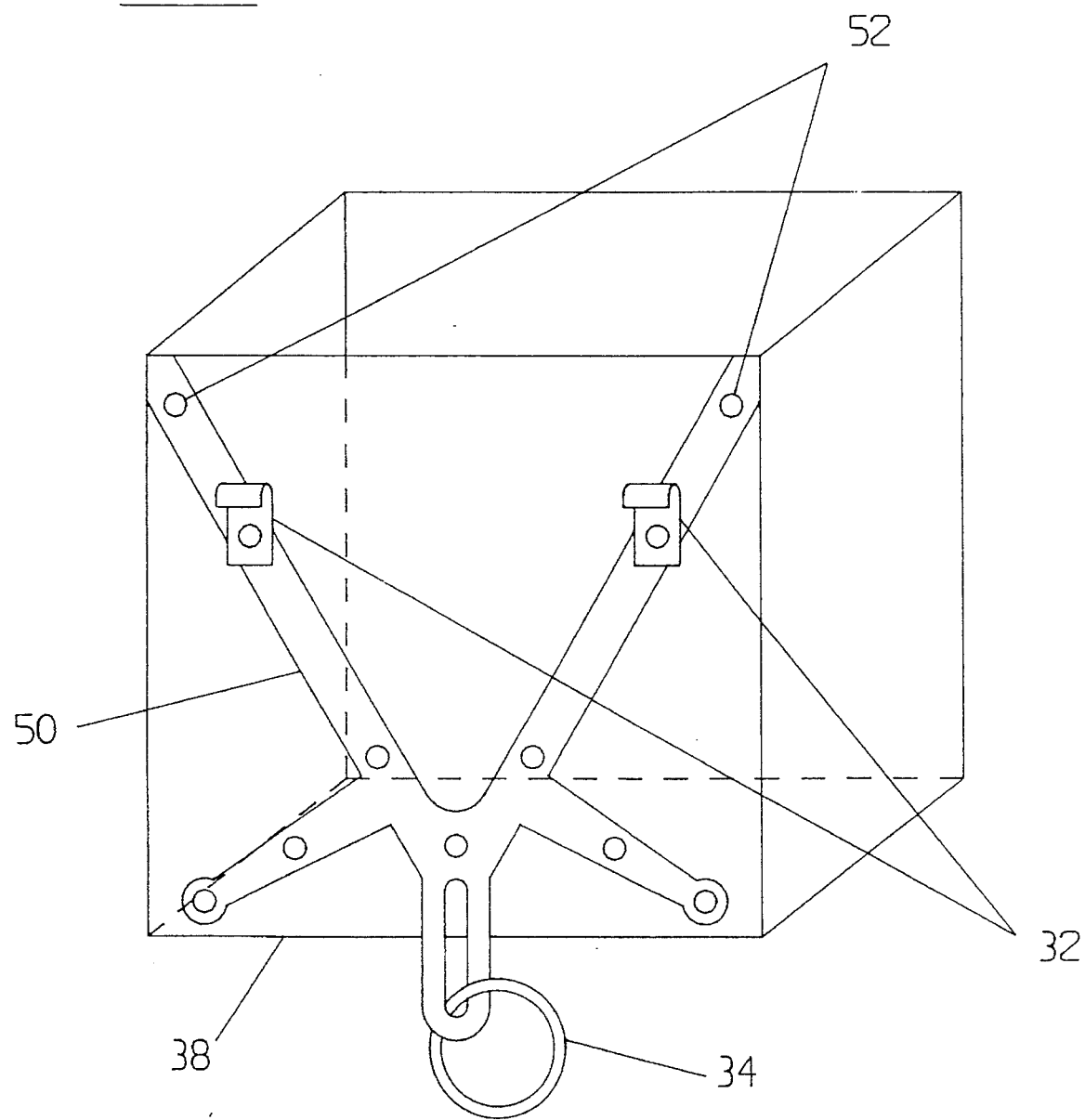

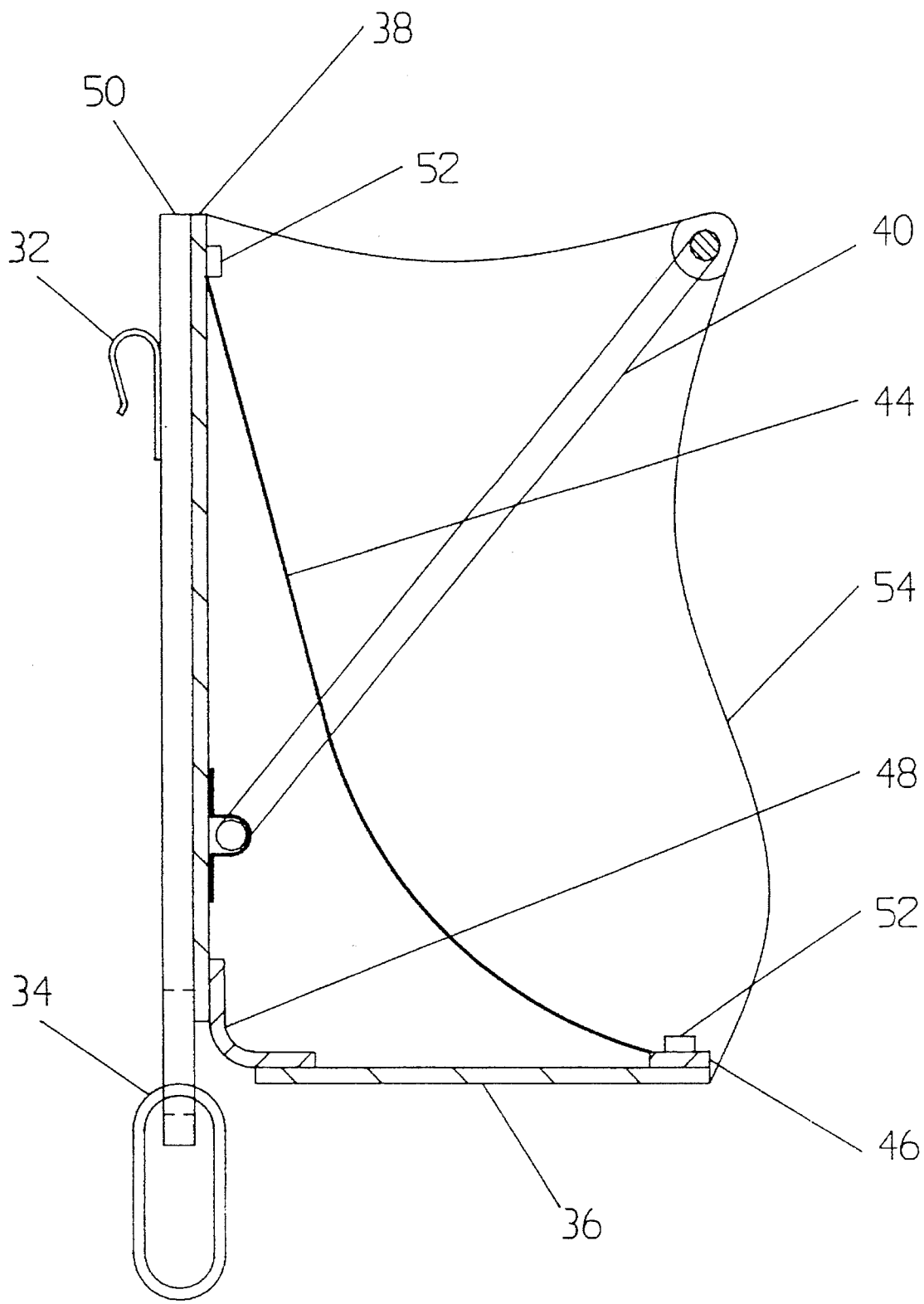

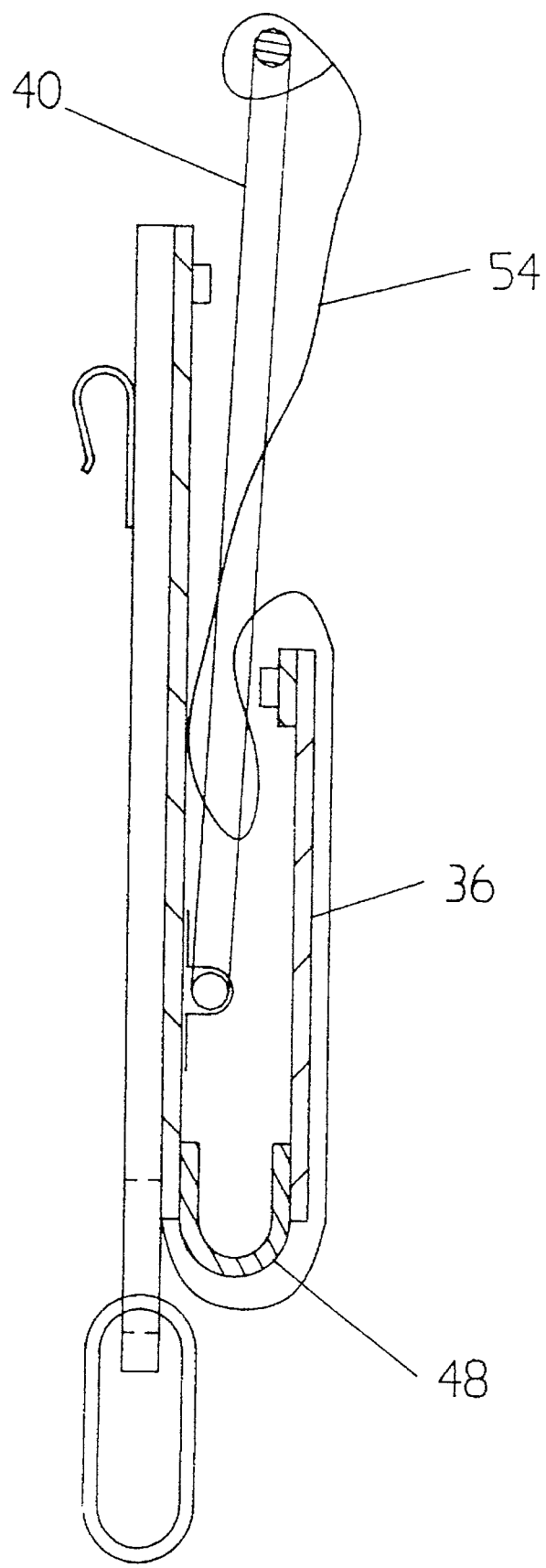

PRIOR ART

FRAMED PANNIER AND MOUNTING ARRANGEMENT FOR REAR CARRIER BICYCLE RACKS

BACKGROUND—FIELD OF THE INVENTION

This invention relates to bicycle panniers, specifically to those intended to be mounted to a conventional rear bicycle carrier rack.

BACKGROUND—DESCRIPTION OF PRIOR ART

Bicycling has entered a renaissance. The bicycle had been abandoned by the public at large in favor of the automobile as a means of transportation. Some of the public has had second thoughts about the automobile and has enthusiastically returned to the bicycle as a means of transportation.

One capacity of the bicycle that remains manifestly inferior to that of the automobile is its ability to carry cargo.

Rear wheel straddling bicycle carrier baskets were long recognized as a sensible way to carry relatively large and heavy loads on a bicycle because they generate less detrimental effects upon the handling and stability of a bicycle than carriers that attach to other locations. Unfortunately, a securely mounted rear wheel straddling bicycle baskets is heavy, undetachable, and unsightly.

U.S. Pat. No. 4,151,939 to Jorjorian et al. (1979) presents a detachable, folding rear bicycle basket carrier. It however remains heavy and unsightly, and requires a special mounting bracket that must remain permanently attached to the bicycle even when the baskets are not being carried.

U.S. Pat. No. 4,295,586 to Shockley (1981) presents a lighter, flexible rear wheel straddling carrier. However it is not intended to be removed from the bicycle, so its large complex support mechanism must remain permanently attached to the bicycle even when the carrier is empty and not in use.

U.S. Pat. No. 3,934,770 to Larsen (1976) presents another rear wheel straddling carrier, that similar to Shockley's design cannot be removed from the bicycle whenever the carrier is empty and not in use.

U.S. Pat. No. 4,662,548 to Jackson et al. (1987) presents a lighter, flexible rear wheel straddling carrier that folds up compactly when empty and that can be removed from the bicycle when its not in use. However, in operation, this carrier proves to be less capable than desired due to inherent limitations in its design that will be discussed further. In particular, the design gives no thought to how the structural loads are carried through its simple frame.

A key feature to U.S. Pat. No. 4,662,548 is its U-shaped folding leg frame that will support the bag in an open position when it is loaded. This principle has been used in numerous other prior art non-bicycle applications: U.S. Pat. No. 545,551 to Tanquary (1895); U.S. Pat. No. 1,214,761 to Craig (1917); U.S. Pat. No. 3,716,938 to Ammons (1973); and U.S. Pat. No. 4,537,377 to Shewchuk (1985). The U-shaped frame leg has also been used in other prior art bicycle and motorcycle applications with a similar purpose: U.S. Patent to Jackson et al. (1982); U.S. Pat. No. 4,418,850 to Jackson et al. (1983); U.S. Pat. No. 4,542,839 to Levine et al. (1985); and U.S. Pat. No. 4,580,706 to Jackson et al. (1986).

The U-shaped folding frame leg serves two functions: When the bag is open and carrying an article, the bar holds the mouth of the bag open and helps to support the load; and when the flexible bag is empty and shut, the bar provides definition to the bag's shape bag so that it does not become unduly loose as it is carried on the rear of a bicycle.

Unfortunately, this U-shaped frame leg begets one disadvantage: When the bag is loaded, it loads the fabric edge of the bag in tension along the top. (See FIG. 12.)

Because the pivot of the bar is free to rotate, the U-shaped bar can only provide a compressive resistance force along its longitudinal axis. A tensile reaction force is thus created in the fabric of the bag itself that must hold everything in equilibrium. This is both unintended and undesirable because a small section of fabric is forced to support a load that is not much less than the weight of all that is being carried by the bag.

An alternate to the U-shaped frame leg is to use a two member frame to hold open a bag in a manner similar to U.S. Pat. No. 3,802,620 to Ferrara (1974). (See FIG. 13.) One frame member serves in tension and the second frame member serves in compression. The bag's frame is thus held in equilibrium without creating an unintended and undesirable tensile reaction force in the bag itself.

A second limitation to U.S. Pat. No. 4,662,548 is that its two flat panels provide an inadequate structure to securely hold a heavily loaded bag. The back panel serves principally to prevent the bag from becoming entangled in the spokes. The one bottom panel serves principally to provide definition for the bottom of the bag. The bag possesses no structural element other than these.

Thus, the back panel alone must also react the tensile load in the fabric that has been induced by the U-shaped frame leg. Unfortunately, the back panel is unsuited to do this because it lacks a fixed support that provides the panel with stiffness. When the pannier is loaded, both ends of the back panel are bent rather far outward. The panel bends all the way form both top corners to both top mounting hooks, which because they too cannot react the panel's bending, must also turn and bend outward in compliance with the panel's deformed shape.

This load path creates a significantly weak structure. Not too heavy a load can break or permanently bend the back panel. The unreached moment force at the two hooks can also force them to tear-out of the back panel.

Structurally, there are other shortcomings.

The short horizontal flange on the back panel is a true design flaw: Its short coupling almost insures that the flange will break or permanently bend when the bag is loaded heavily.

The common hinge that serves as a pivot for both panels and the bar is also a functionally poor concept. It directs both the supporting force of the U-shaped frame leg and supporting force of the bottom panel far away from the bag's two points of support, the pair of hooks that mount to the rear bicycle rack. It also induces the most detrimental type of reaction force in the flat panels of the pannier: concentrated, out-of-plane reaction forces. This type of force results in the greatest deflection and the highest level stress the pannier's flat panels. It causes the bag's entire frame to be inherently flimsy.

Across the bottom panel, the bag's load results in a vertical, out-of-plane shear force that is distributed across the entire plate. However, the hinge pair dictates that the reaction force must be concentrated at the two corners where the hinges are. Thus, two concentrated vertical, out-of-plane forces are introduced that seriously reduces the bottom panel's capacity to carry and securely support much load.

The common hinge creates these undesired concentrated out-of-plane forces in the back panel too.

Whenever the bicycle is ridden, transverse forces are created by the inertia of the pannier's load. These forces have immediate and significant effect upon the bicycles handling and stability. The rigid pivot of the pair of hinges transmits the transverse force form the bottom panel where the pannier's load rests to the back panel that attaches to the bicycle. Thus, an in-plane force in the bottom panel is converted to an out-of-plane force in the back panel. This seriously reduces the back panel's capacity to carry and support much load. Furthermore, the loose, compliant structure of the pannier adversely effects the bicycle's stability too.

A third limitation to U.S. Pat. No. 4,662,548 is the means by which it becomes easily detachable: U.S. Pat. Nos. 3,934,770; 4,151,939; and 4,295,586 all retain secure three-point mounting schemes. U.S. Pat. No. 4,662,548 does not. The omission of a third mounting point is no advantage when it compromises security of the bag's attachment. The two-point mount allows the bag to swing freely around the two hooks that hold it. In addition, the bag can also easily unhook itself too when in use.

Many detachable three-point mounting schemes for removable bicycle panniers have been proposed.

U.S. Pat. No. 3,786,972 to Alley (1974) presents a three-point mounting method comprised of two hooks and one long extension spring, where the spring runs from the top to the bottom of the bag. Because the extension spring can only apply a force in the direction of its longitudinal axis, this spring does no more than preload the two hooks that hold the bag to the rear bicycle rack so the pannier can resist up-down motion. The spring's solely vertical orientation prevents from resisting either the transverse inertial loads or the fore-aft inertial loads that the pannier experiences too. In addition, the pannier posses no internal frame at all other than its stiffened back. Not only does the pannier's bag support the load alone, but it must also react the downward reaction force created by the load of the extension spring. This combination of both the load supporting force and the pannier attachment force results in a design that is adequate for carrying only light loads.

U.S. Pat. No. 3,937,374 to Hine, Jr (1976) presents a similar three-point mounting method, but employs two long extension springs rather than one. This provides not just the vertical spring force that one spring provides, but a fore-aft spring force that is the product of the use of two non-parallel springs. Although this method provides support across a vertical plane rather than along a vertical line as the earlier method provides, there is now a greater spread from the extension springs' attachment points to the hook attachment points which exasperates the problem created by the downward load of the extension springs. And there is still no spring force to resist the pannier's transverse inertial loads. And still, the pannier posses no internal frame, other than its stiffened back. Therefore, this design also remains incapable of supporting anything other than light loads.

U.S. Pat. No. 4,262,829 to Hine, Jr. et al. (1981) essentially duplicates his earlier patent in intent and function, but has replaced the earlier design's two extension springs with a single long elastic shockcord. This alteration neither changes nor improves upon the earlier design essential characteristics, and results in a pannier with no greater rigidity and load capacity than its predecessor.

U.S. Pat. No. 4,516,705 to Jackson (1985) also offers another small improvement upon U.S. Pat. No. 3,937,374.

Here a spacer tube is inserted between the two extension springs to ensure a force balance between the two springs in the fore-aft direction. Also a single spring clip aids the pannier's two hooks to improve their grasp. Neither of these improvements enhances this design much beyond its prior art predecessor.

U.S. Pat. No. 3,903,944 to Montgomery et al. (1975) presents a simple bag with no greater rigidity than that provide by the elastic material used in its construction. The third-point to its three-point mounting scheme is nothing other than a fabric strap that fails to provide even a pre-load to its two hook mounts. Furthermore, this strap can only fasten to an attachment that must remain permanently fixed to the bicycle. This pannier's rigidity and load capacity is extremely limited.

U.S. Pat. No. 3,955,727 to Montgomery (1976) improves upon his earlier patent by including a single rigid internal frame member within the bag. It improves upon the previous pannier's load capacity somewhat, but still fails to pre-load the hooks to hold the panniers more securely to the bicycle's rear rack. The design still retains the light load capacity of its predecessor.

U.S. Pat. No. 4,271,996 to Montgomery (1981) presents an internal pannier frame that provides both vertical and longitudinal stiffness. No transverse stiffness through the depth of the pannier is provided, which limits the depth of the bag it may support. This might be just as well because, unlike the frame presented in U.S. Pat. No. 3,934,770 and the other patents cited earlier, this internal frame cannot be collapsed and folded when empty, which further limits its utility.

U.S. Pat. No. 4,271,996 does include a three-point mounting method identical to that presented in U.S. Pat. No. 3,786,972. It suffers the same limitations of this design, though the internal frame improves upon the previous design's capacity somewhat.

Because this design uses an attachment scheme that matches U.S. Pat. No. 3,786,972, it has forgone a potentially improved mounting scheme that could have used a three-point mounting scheme similar to U.S. Pat. No. 3,937,374 instead. The internal frame could have been fortuitously used to react the compressive force generated by the considerably longer spread between the spring and hook attachments of U.S. Pat. No. 3,937,374, rather than the significantly shorter spread between these attachments of U.S. Pat. No. 3,786,972. This could have resulted in a pannier with a greater load capacity. Instead, U.S. Pat. No. 4,271,996 results in a pannier system with a greater load capacity than its attachment method allows. The outcome of this could be a heavily loaded pannier bag flying loose from its insufficient mount because either the fore-aft or transverse inertia of the bag easily overcomes the extension spring's force that acts as a pre-load on the pannier's hooks.

U.S. Pat. No. 4,174,795 to Jackson et al. (1979) present another three-point mounting method. Unfortunately it requires the use of a non-conventional rear bicycle rack and is incompatible with other style racks.

U.S. Pat. No. 4,353,490 to Jackson et al. (1982) presents yet another three-point mounting method. Again it requires the use of a non-conventional rear bicycle rack and is incompatible with other style racks.

U.S. Pat. No. 4,353,490's quick-release retainer is also unusual in that it imparts no vertical tension to the pannier and would be incompatible the hook pairs that are commonly used with other pannier designs.

U.S. Pat. No. 4,671,438 to La Plante (1987) uses a five-point method to secure a pannier. Unfortunately, it is not even remotely compatible to the conventional rear bicycle rack and requires its own peculiar rack design.

U.S. Pat. No. 4,577,786 to Dowrick et al. (1986) presents a typical three-point mounting method with the addition of a locking clamp member which improves the security of the pannier's purchase, but also provides increased complexity to both pannier's design and use.

U.S. Pat. No. 4,328,915 to Melton, III (1982) presents a rigid, detachable two-point mounting system to secure a bicycle basket that is incompatible with more flexible pannier bags, because the mounting method must utilize the basket's rigidity to function. Also, this mounting method requires the use of a non-conventional rack that must contain a swing-away support member.

BACKGROUND—DESCRIPTION OF PRIOR ART—FOREIGN

French Patent 1,090,075 to Demy (1955) presents a method of attaching a pannier similar to both U.S. Pat. Nos. 3,786,972 and 4,271,996. An extension spring runs from a short plate mounted below a bracket that supports a pair of adjustable top hooks and attaches to a bottom hook attachment. Like with these two other American inventions, the extension spring serves only to pre-load the two top hooks so the pannier can resist up-down motion. The spring's vertical orientation prevents it from resisting either transverse inertial loads or fore-aft longitudinal loads.

French Patent 1,013,732 to Lucas (1952) presents an independent pannier holder that attaches to the rack that supports the pannier. It has a movable bottom hook pulled by a remote rod end that can catch and release a ring that serves as the pannier's bottom attachment. It has the disadvantage that it remains attached to the rack when the pannier is removed, or that it must also be removed itself from the rack when it carries no pannier.

Because this independent pannier holder attaches to the rack and is not an integral part of the pannier, it provides no additional stiffness and support for the pannier itself, so the load carried in the pannier may move and sway as much as the pannier will allow, whether or not the pannier holder is used.

French Patent 1,102,369 to Cordier (1955) presents another three-point mounting scheme that pre-loads a top pair of mounting hooks. A movable "tirette" (cord/slide) is spring loaded by a pair of extension springs connect to a top plate that supports a pair of top mounting hooks. The "tirette" itself is held close the pannier by a second bottom plate. Both the top and plate of this invention are two sided and sandwich the pliable material of the pannier bag between their two haves.

Because both the top and bottom plate remain unsupported except for the material of the bag, they cannot contribute to support the load carried. The bottom plate incidentally is unnecessary because it supports no direct load. All the spring tension for the "tirette" acts only on the top plate and none acts on the bottom plate. Furthermore, because the bottom plate is only supported by the material of the pannier bag, it can provide no additional stiffness for transverse and longitudinal inertial loads.

The top plate meanwhile reacts at one end the downward pull of the springs that hold the "tirette" and at the other end the upward reaction force on the pair of top hooks. The downward force of the load carried is held in tension only by the bag material sandwiched between both haves of the top plate. Thus, the fastening system does nothing to help supporting the load on the pannier bag. It merely provides a convenience for attaching and removing the pannier bag. And indeed, the specification of this invention claims no more than this.

British Patent 730,586 to Smith (1955) presents a pannier carrier that supports a flexible bag by use three member frame composed of: a rigid link, a bottom bracket, and a moving slide. When open, this pannier carrier supports its load in a manner similar to the two member frame of U.S. Pat. No. 3,802,620 to Ferrara (1974). However, the three member frame of British Patent 730,586 (See FIG. 14) cannot close with the ease of the two member frame (See FIG. 13). The Cyclist must push the bottom bracket up from the rear rather than fold it up the front. Furthermore, when fully closed, the forward edge of the bottom bracket of the pannier carrier hangs lower than when open.

Under dynamic loads similar to the bouncing of a moving bicycle, the three member frame of British Patent 730,586 suffers a further disadvantage relative to the two member frame of FIG. 13. Because the bottom bracket of the three member frame folds down and out as it closes rather than folds up and in as the two member frame does, the pannier can simultaneously close and drop its cargo. This can happen when the cargo load shifts to the outward edge of the pannier bag. A jar to the load under this condition may cause the bottom to turn up slightly. The continued weight at the outward edge can then drive the outward edge down as the inward edge folds up, thus folding closed the bag closed and dropping the cargo together.

Tightening firmly a pair of wing nuts on the slide provides resistance to inhibit the slide from moving upward when the pannier carrier is open, but when the Cyclist fails to torque down the wing nuts sufficiently tight or forgets to tighten the wing nuts at all—both foreseeably frequent occurrences, the inherently dynamically unstable condition of the pannier carrier remains uncorrected.

Finally, because the moving slide of British Patent 730,586 is more complex than a fixed pivot, it is more prone to wear out, bind up, or break in shear. Because the wing nuts can easily loosen and fall off, the Cyclist may continue to use the pannier carrier without them—an inherently unsafe condition.

British Patent 734,278 to Smith (1955) presents a further improvement to British Patent 730,586. Here draw cords support both folding sides of the pannier carrier. Although they provide a more desirable and sturdy addition for the support of cargo, both draw cords must be arranged, pulled, and tied tight every time to fit whatever load is carried, which adds additional inconvenience for the use of this pannier.

OBJECTS AND ADVANTAGES

The object and advantage of this invention is to create a light, easily detachable rear-wheel straddling bicycle pannier that can be collapsed and folded when empty; that will mount in a secure manner when attached to a conventional rear bicycle rack carrier; and that employs a structural frame capable of supporting a heavy load securely and safely. To achieve these aims, this invention uses a new combination of internal and external frame members and a new method of attachment to the conventional rear bicycle rack. These features include:

(a) Two flexible strut wires that support the two free corners of the bottom panel, so that the bag's fabric does not support the pannier's load in tension. This suspension member also serves as the position check stop that defines the bag shape when its loaded.

(b) A beam member fixed to the forward edge of the bottom panel that connects the two strut wires, so that the bottom panel does not react the suspension force itself.

(c) An integral plastic hinge, that connects the bottom and back panels along their entire length as a bendable corner, so that the shear load from the bottom panel is applied to the back panel along its entire length rather than at two hinge pivots. Also, the integral plastic hinge transmits significantly less transverse force through itself than a rigid hinge pivot. This method of attachment substantial increases the rigidity and reduces the deflection of both flat panels. In addition, it enhances the stability of the bicycle too.

(d) A U-shaped rod that defines the bag's open mouth and that helps define the bag's shape when it is empty, collapsed, and folded. This U-shaped rod no longer functions as a position check stop to define the bag's shape when its loaded and no longer induces a tension reaction force in the bag's fabric. Its two lower pivots will be located as far below the bag's mouth as possible to allow the bag to fold into the shortest, most compact shape that it can.

(e) A skeleton frame fixed to the back panel that directly connects the five load bearing points on the back panel. These are: the attachment points for the two strut wires; the top pair of attachment points of the pannier, which are the pair of hooks that grasp the top horizontal bar of a conventional rear bicycle rack; and the elastic third-point of a three-point mounting scheme. This skeleton frame substantially increases the panniers rigidity and stability because the bag's back panel reacts against neither the forces that attach it to the rear rack nor the tension forces that support the bag's load. This too allows the widest possible spread between the pannier's three attachment points for the greatest possible rigidity and stability.

(f) A removable tote strap can be fastened directly to the pannier's frame. This allows a cyclist to remove a bag form the bicycle and easily carry it with him, even when the bag is full. Because the strap attaches to the bag's frame rather than its fabric, the bag's load geometry remains identical to that when it is attached to the bicycle. This prevents the bag from sagging and folding up when the cyclist carries it.

(g) A short loop of elastic material connects the pannier's skeleton frame to the bottom hook-end of a conventional rear bicycle rack. This allows a shorter, tighter grip to the rack than that achieved with a hook and strap, because the loop's length is much shorter hook and strap's combined lengths. Because the tension force in this method of attachment is less vertically oriented than the prior art, it provides more resistance to other pannier's tendency towards inertial side sway. When used together in conjunction with the pannier's skeleton frame, this results in a more secure pannier attachment, which has little play and wiggle. Thus, the pannier may support a greater load more securely and safely. Another advantage for this method of attachment is that it has no hook to snag clothing when the cyclist carries the bag off the bicycle by its tote strap.

(h) An alternate design to (g): A rigid third-point for a three-point mounting scheme that is quickly detachable from a conventional rear bicycle rack. It provides greater rigidity and stiffness than an elastic attachment scheme can and provides for unparalleled load capacity and carrying security from a conventional rear bicycle rack. This method not only provides complete resistance to inertial side-sway, but also provides resistance to inertial yawing motion too that neither (g) nor any prior art three-point method of attachment provides.

(i) A convertible cover can be either fastened across the pannier's mouth or stowed out of the way against the back panel. This feature is possible because the bag's frame does not load the fabric in tension, so that a closed cover or the lack of one will not effect the pannier's ability to carry and support its load. This allows the cyclist to chose either an open top for convenience or a closed top for protection.

(j) At least one space pocket is fitted to the pannier to hold items outside the main compartment. This can prevent small items from becoming lost and allow other items to be retrieved quickly.

Further objects and advantages will become apparent from a consideration of the ensuing description and drawings.

DRAWING FIGURES

In the drawings, closely related figures have the same number but different alphabetic suffixes.

FIG. 3 shows a back view of the pannier's frame.

FIGS. 4A and 4B show the pannier bags' cross section in both the open and folded position.

Figure 1:
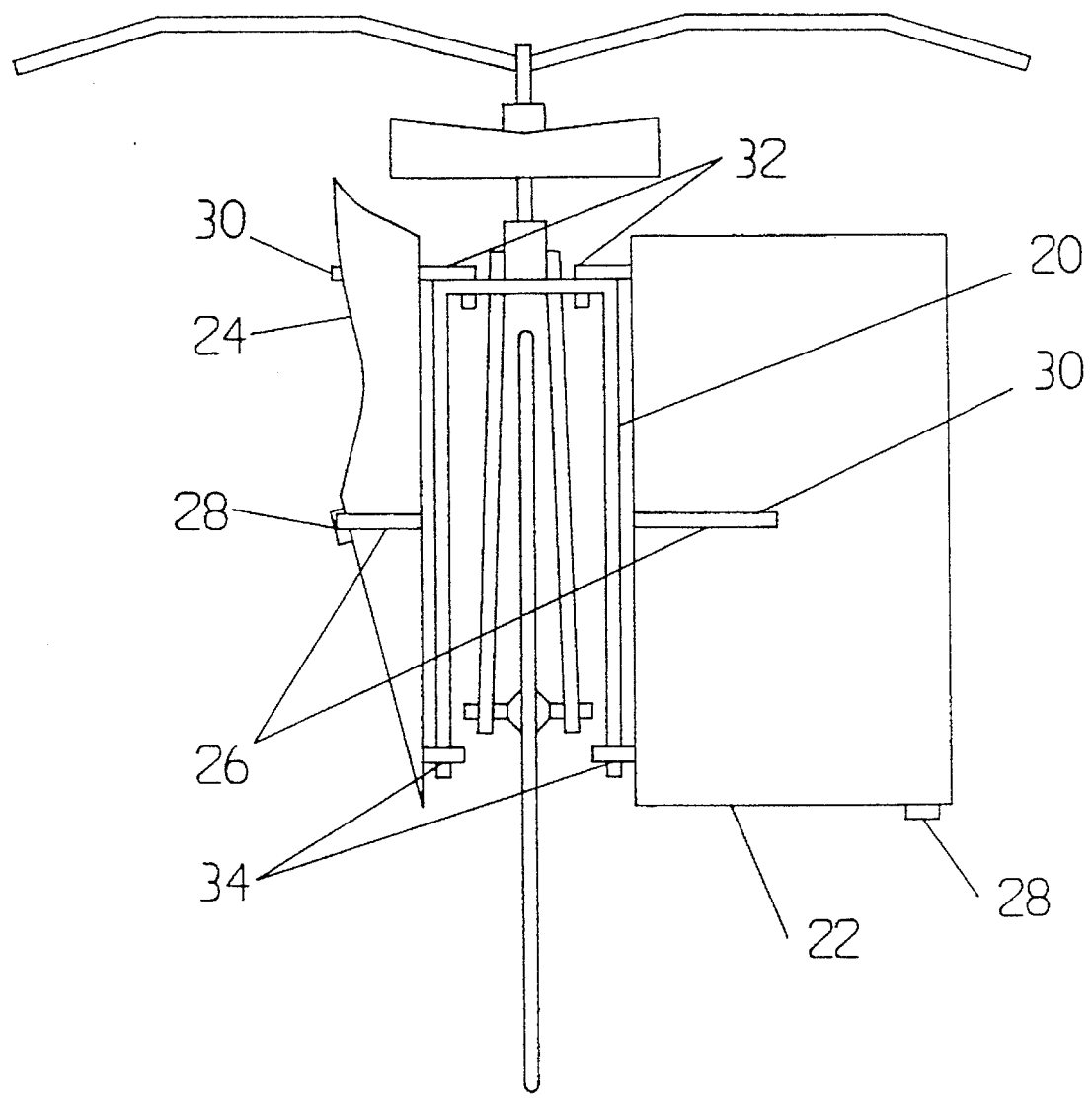
FIG. 1 shows both an open and a folded pannier bag attached to a conventional rear bicycle rack.

REFERENCE NUMERALS IN DRAWINGS 20 rear bicycle rack
22 open pannier bag
24 folded pannier bag
26 fastener strap
28 closed position fastener
30 open position fastener
32 top hook 34 elastic loop
36 bottom panel
38 back panel
40 U-shaped rod
42 bar hinge pair
44 strut wire
46 horizontal beam
48 integral plastic hinge
50 skeleton frame
52 wire attachment point
54 fabric material
56 hook attachment bolt
58 washer
60 nut
62 hook-end of bicycle rack
64 convertible cover
66 closed top fastener
68 open top fastener
70 tote strap
72 tote strap clasp
74 spare pocket
76 slider
78 slider guide bracket
80 slider spring
82 bottom hook blade
84 hook blade slot

DESCRIPTION OF FIGS. 1 to 11

In FIG. 1, a pair of pannier bags are shown attached to a conventional rear bicycle rack 20. On the right, a bag 22 is folded down in its open position. On the left, a bag 24 is folded up in its closed position.

Each bag has a pair of straps 26, with a single strap hung to each side. A pair of strap fasteners 28 are located on the bottom of the pannier bag, with a single fastener on each edge. A second pair of strap fasteners 30 are located with a single fastener on each side of the pannier. A pair of top attachment points, in this case a pair of hooks 32, hold each bag to the top rail of the bicycle rack 20. A short elastic loop 34 attaches the bottom end of the pannier to the bicycle rack 20.

Figure 2:
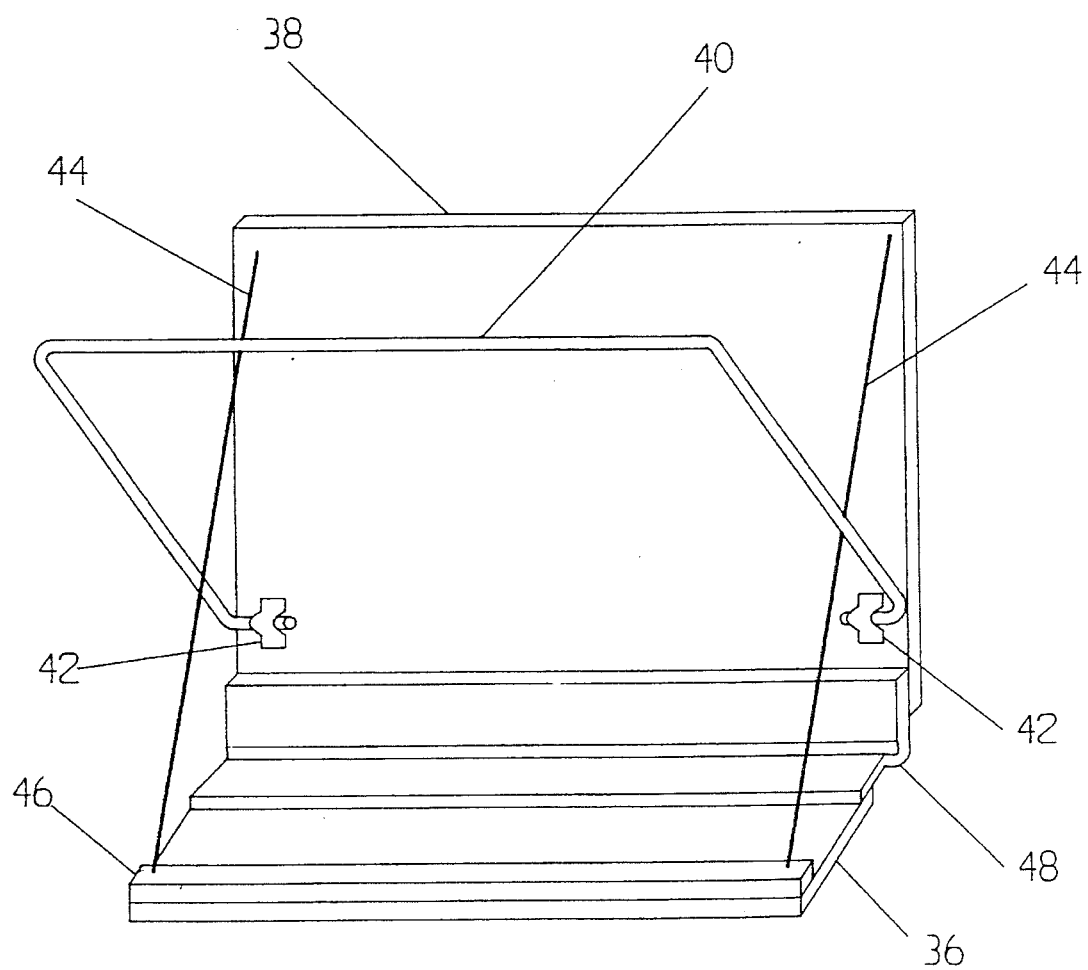
FIG. 2 shows a forward view of the pannier's frame.

FIG. 2 shows a front view of the pannier's frame. Both a bottom panel 36 and a back panel 38 are made of a stiff, but impact resistant material. A rigid U-shaped rod 40 stretches across the front of the pannier and pivots about a pair of hinges 42 mounted to the back panel 38. A strut wire 44 connects the far corner of the bottom panel 36 to the far corner of the back panel 38. A rigid horizontal beam 46 fixed to the bottom panel 36 connects both strut wires 44 together. An integral plastic hinge 48 acts as a bendable corner that connects an adjacent edge of the bottom panel 36 to an adjacent edge of the back panel 38.

FIG. 3 shows a back view of the pannier's frame. The pannier's pair of top hooks 32 attach to a skeleton frame 50 that is securely fixed to the back panel 38. The short elastic loop 34 that functions as the pannier's lower attachment is attached to the same skeleton frame 50, as are two attachment points 52 that hold both strut wires 44.

FIG. 4A shows a cross section of the pannier when it is open and FIG. 4B shows the same cross section of the pannier when it is closed. Two more attachment points 52 hold both strut wires 44 to the horizontal beam 46 and bottom panel 36. A fabric material 54 forms a flexible wall on the pannier's forward edge and along both its sides. The U-shaped bar 40 is sown into a hem of fabric material 54 along the top of the front.

Figure 5:
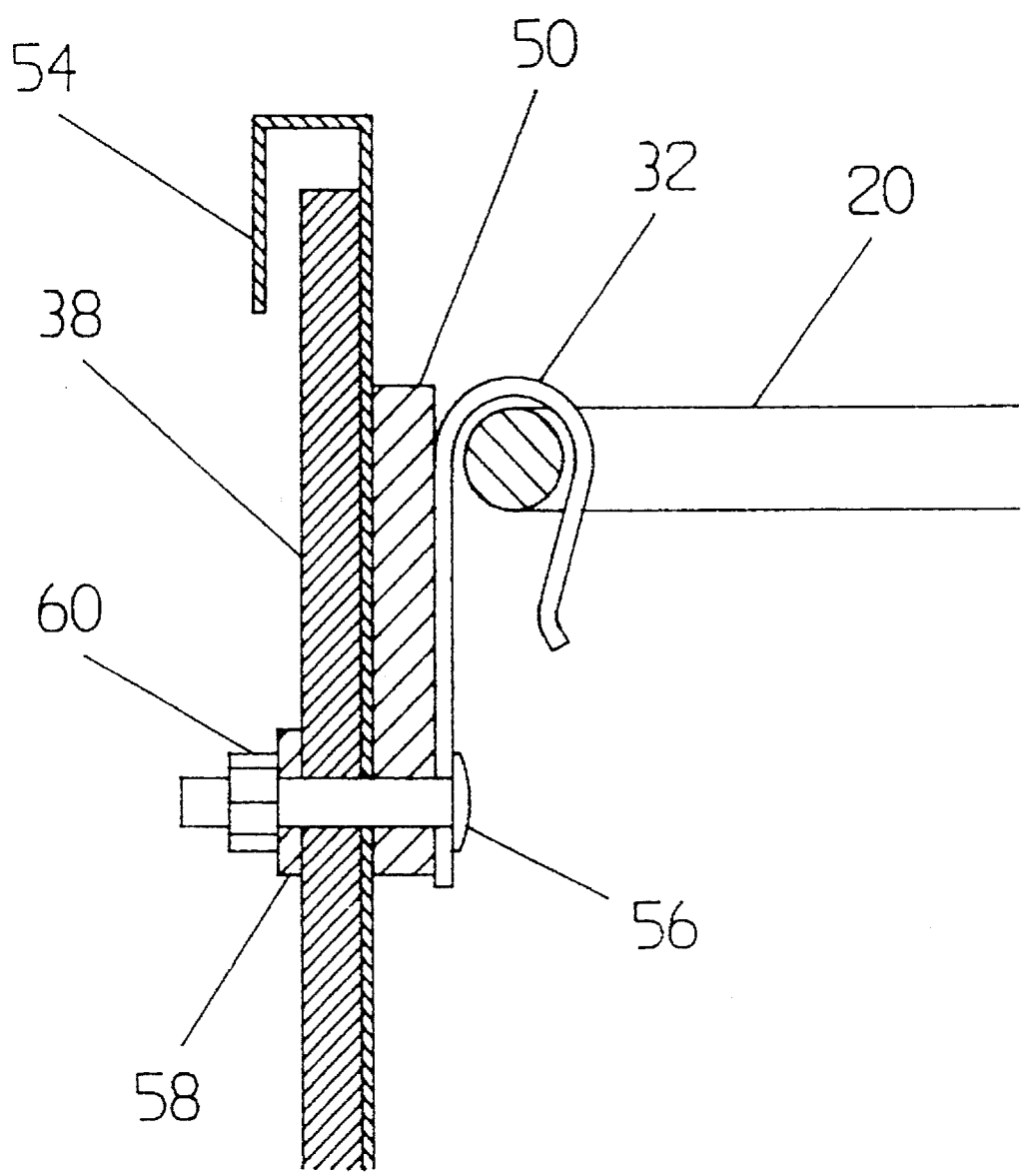
FIG. 5 shows a top hook's attachment to a conventional rear bicycle rack.

FIG. 5 shows a detail of the pannier's top hook 32 mounted to the top rail of a conventional rear bicycle rack 20. A bolt 56 passes through the base of the hook 32, through the skeleton frame 50, through the fabric material 54, and through the back panel 38. The end of the bolt 56 is fastened by a washer 58 and nut 60.

The attachment points 52 that attach the strut wire 44 to the skeleton frame 50 and the horizontal beam 46 also employ this sandwiched joint construction.

Figure 6:
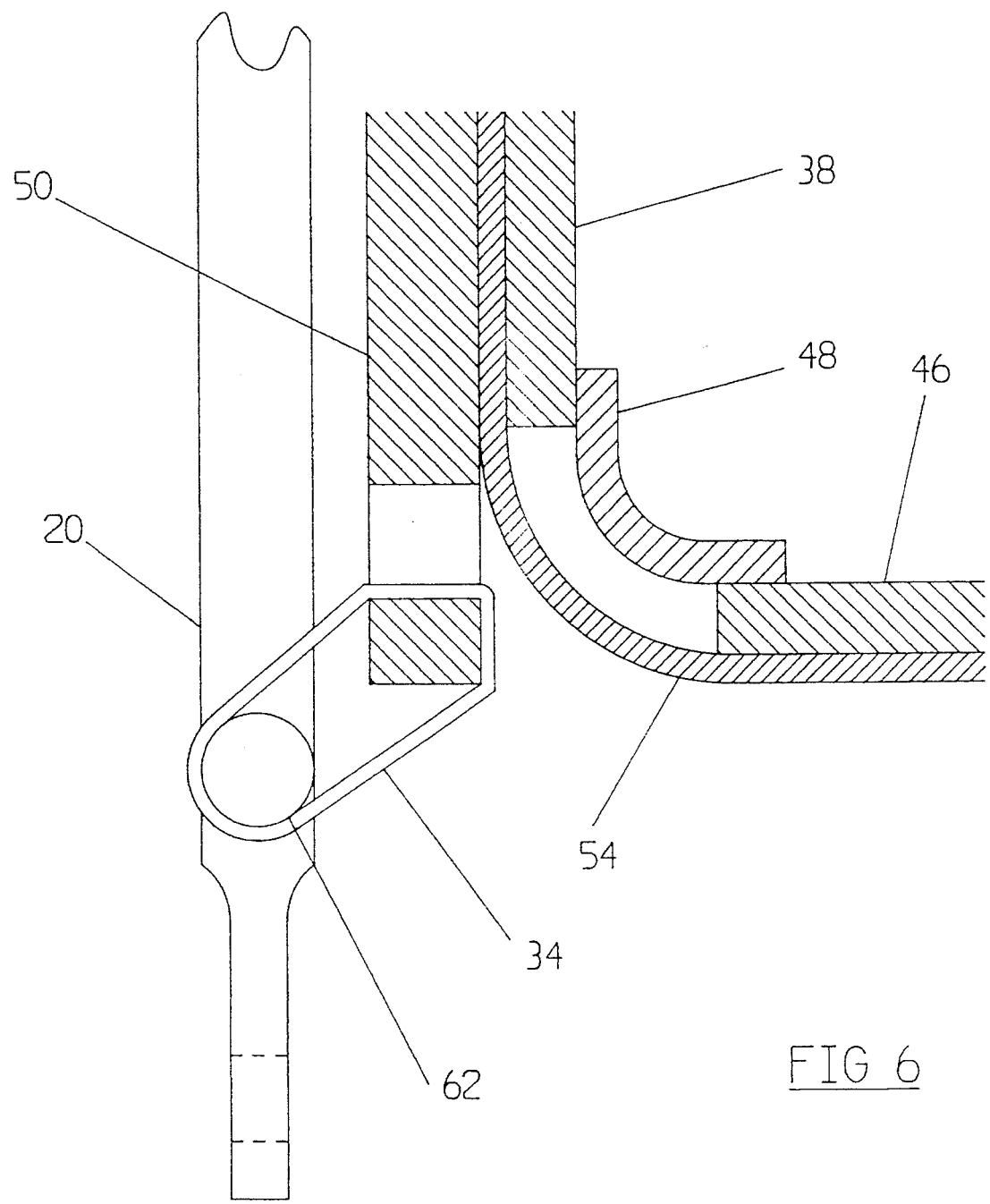
FIG. 6 shows a short elastic loop attached to the bottom hook-end of a conventional rear bicycle rack.

FIG. 6 shows a detail of the short elastic loop 34 wrapped around a bottom hook-end of conventional rear bicycle rack 62.

Figure 7A:
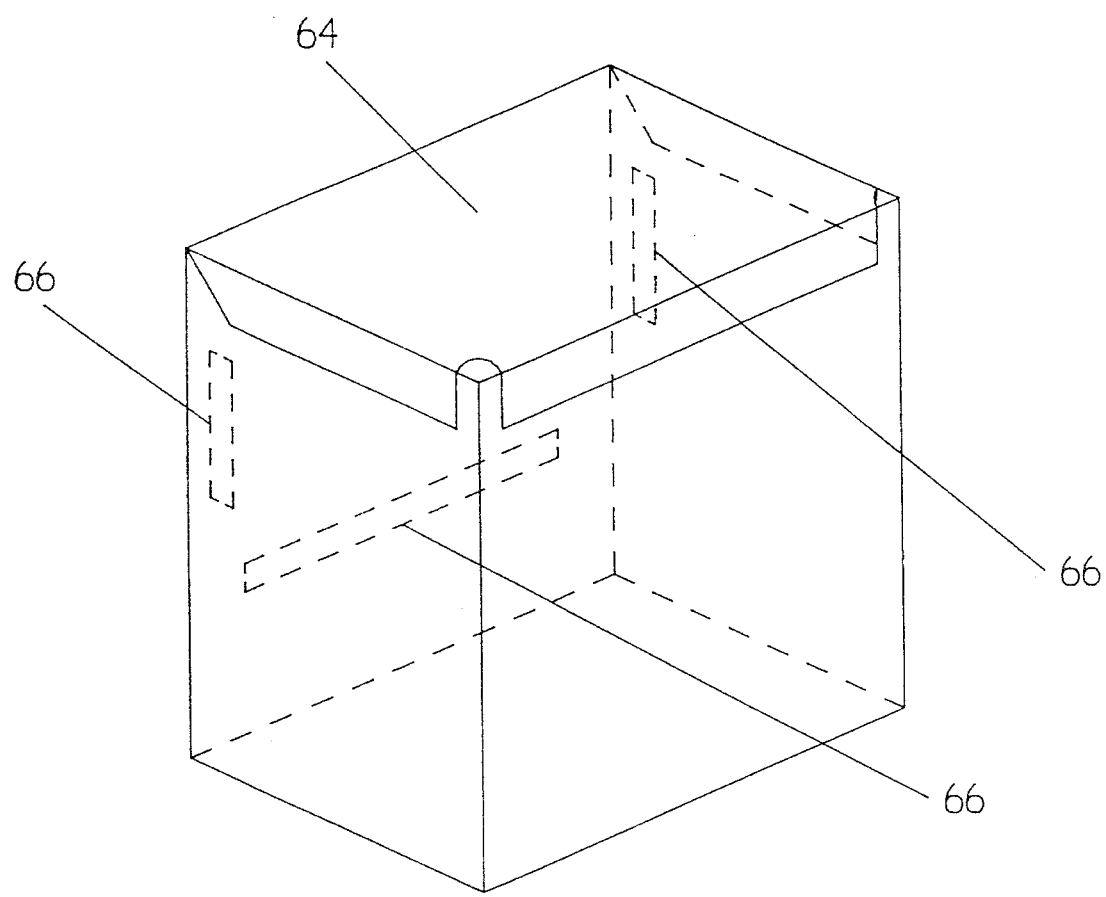
FIGS. 7A and 7B show a convertible cover both fitted across the bag's mouth and stowed out of the way inside the bag.
Figure 7B:
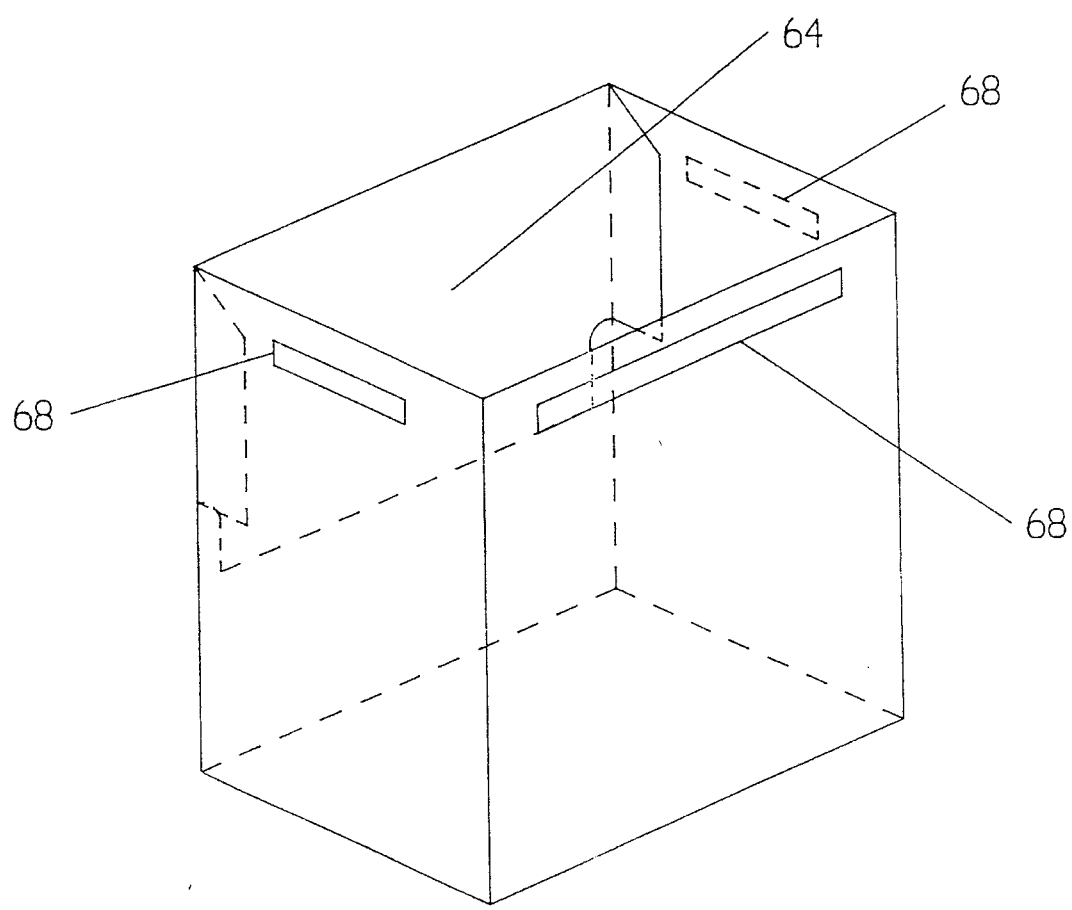

FIG. 7A shows a convertible cover 64 drawn across the panier's top and FIG. 7B shows the convertible cover 64 stowed out of the way inside the bag's compartment. Three fasteners 66 hold the convertible cover's three flaps when it is stowed away and another three fasteners 68 hold the cover's three flaps when it is drawn across the top. The fourth end of the cover is permanently attached to the pannier.

Figure 8:
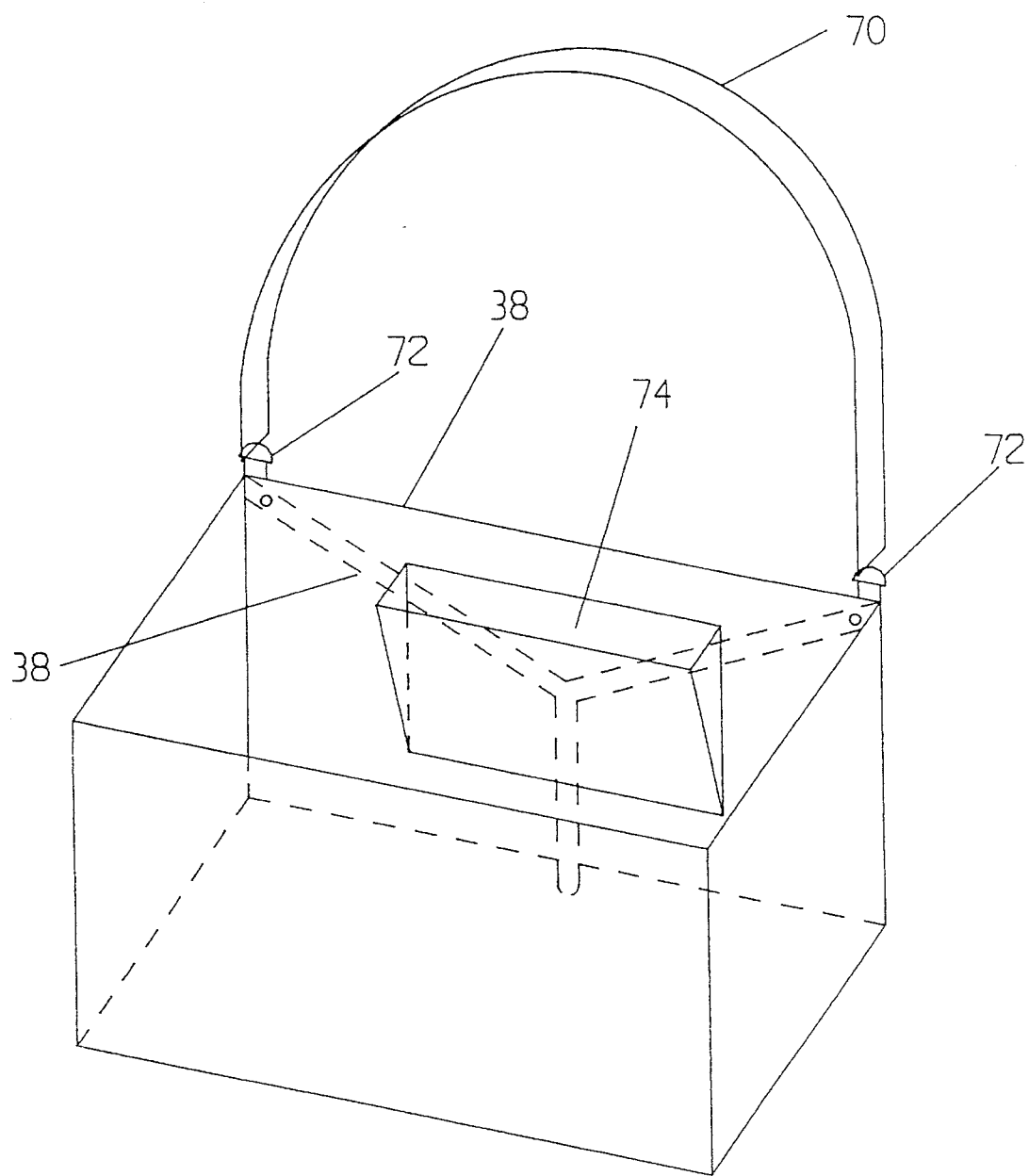
FIG. 8 shows a removable tote strap fastened to the bag's skeleton frame and a spare pocket fitted inside the bag.

FIG. 8 shows a tote strap 70 that fastens to two clasps 72 that are attached to the skeleton frame 50. FIG. 8 also shows a spare pocket 74 is fitted to the back panel 38.

Figure 9:
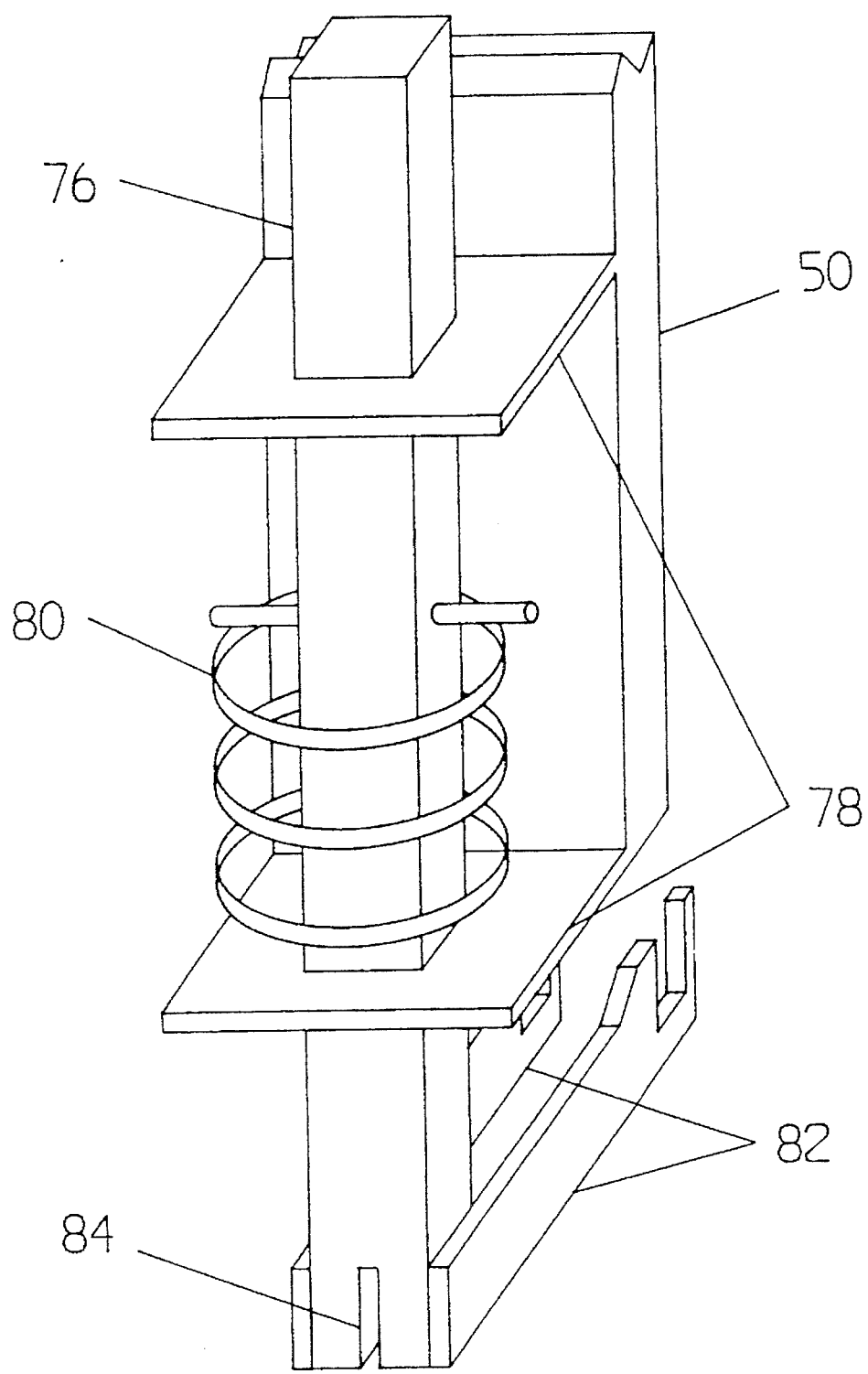
FIG. 9 shows a spring loaded hook for an alternative three-point mounting scheme.

FIG. 9 shows an alternate three point mounting scheme. A slider 76 fits through two slider guide brackets 78 that are fitted to the back of the skeleton frame 50. The slider 76 and its guide brackets 78 are shaped so that the slider cannot rotate inside the guide brackets, but remains free to move up and down. A sing 80 pre-loads the slider 76. Two hook blades 82 attach to the outside edges of the bottom of the slider 76, which also contains a slot for a single blade 84.

Figure 10:
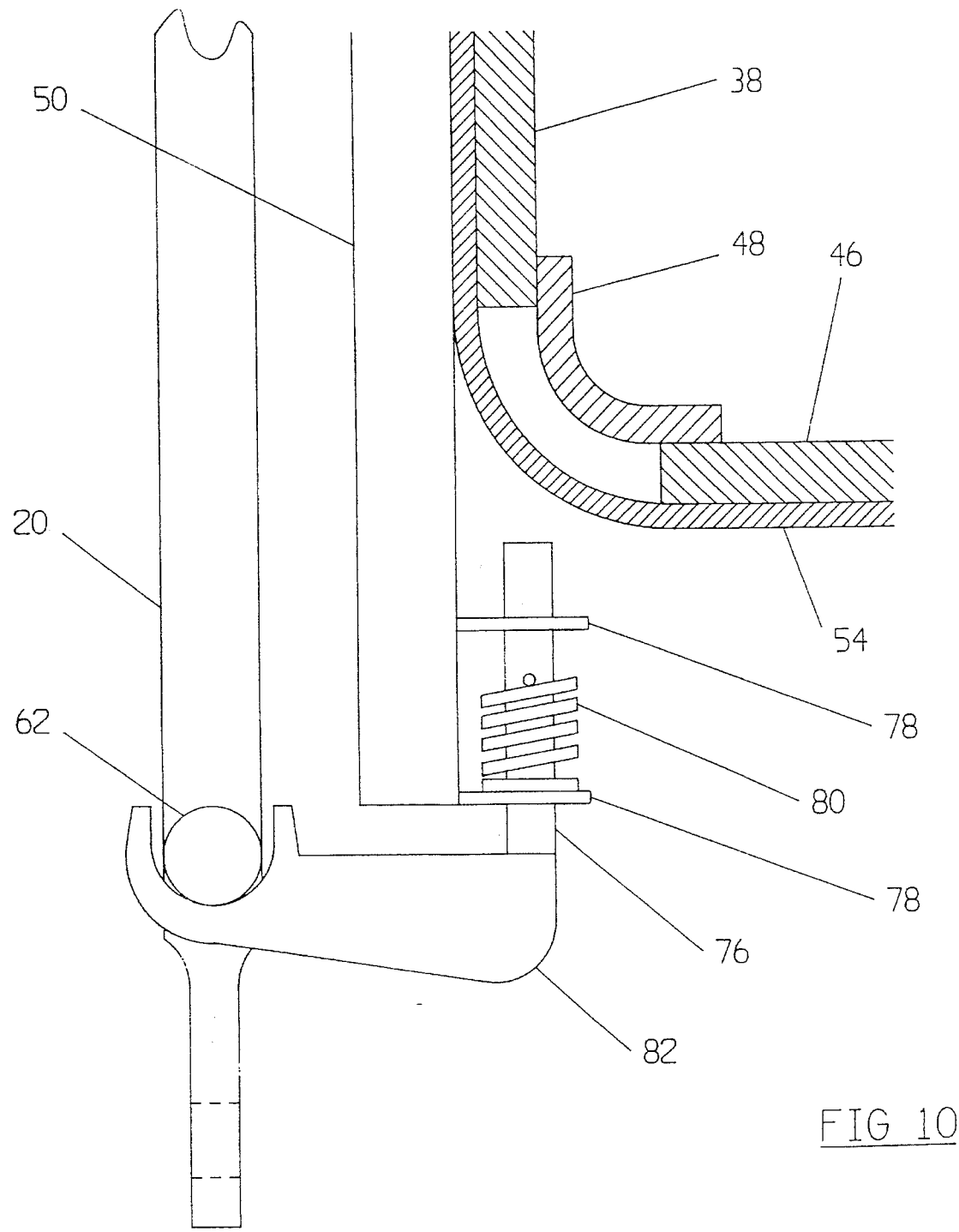
FIG. 10 shows the spring loaded hook attached to the bottom hook-end of a conventional rear bicycle rack.

FIG. 10 shows the alternate three-point mounting scheme attached to a rear bicycle rack 20. The bottom hook blade 82 holds the hook-end of the bicycle rack 62.

Figure 11:
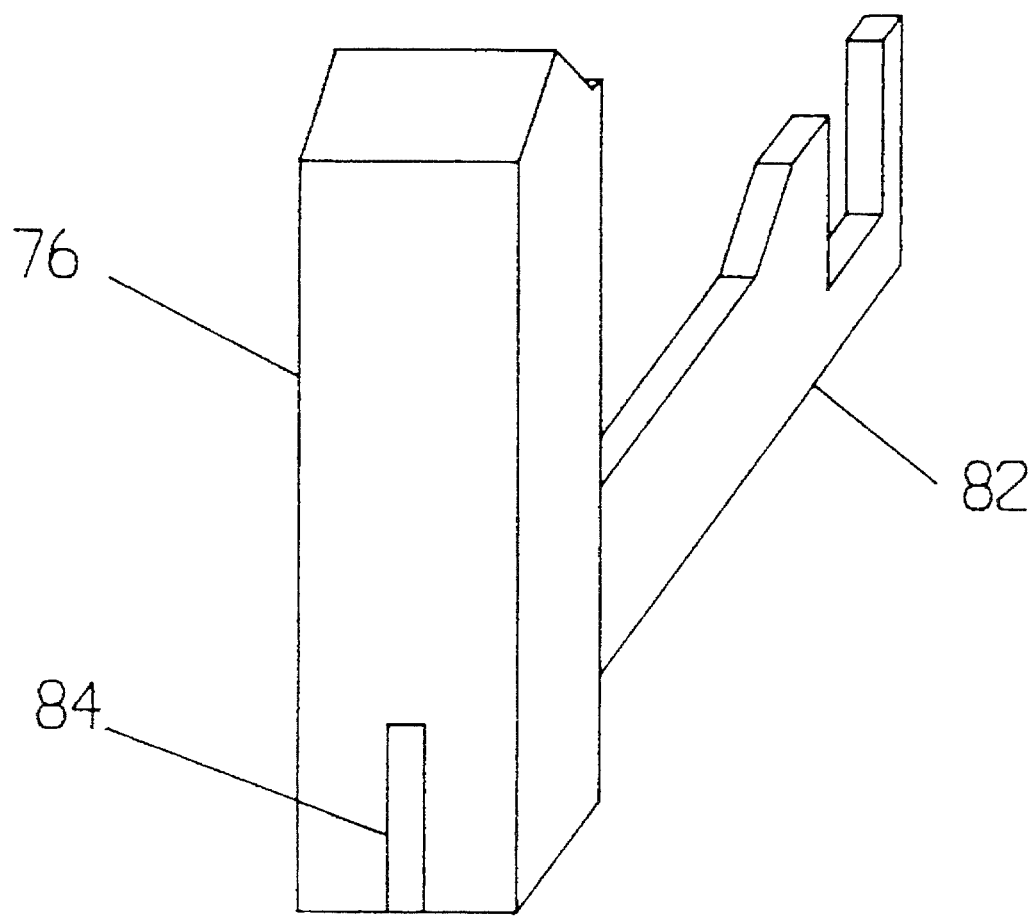
FIG. 11 shows the spring loaded hook fitted with a single blade.

FIG. 11 shows a hook blade 82 fitted in the slot for a single blade 84.

Figure 12:
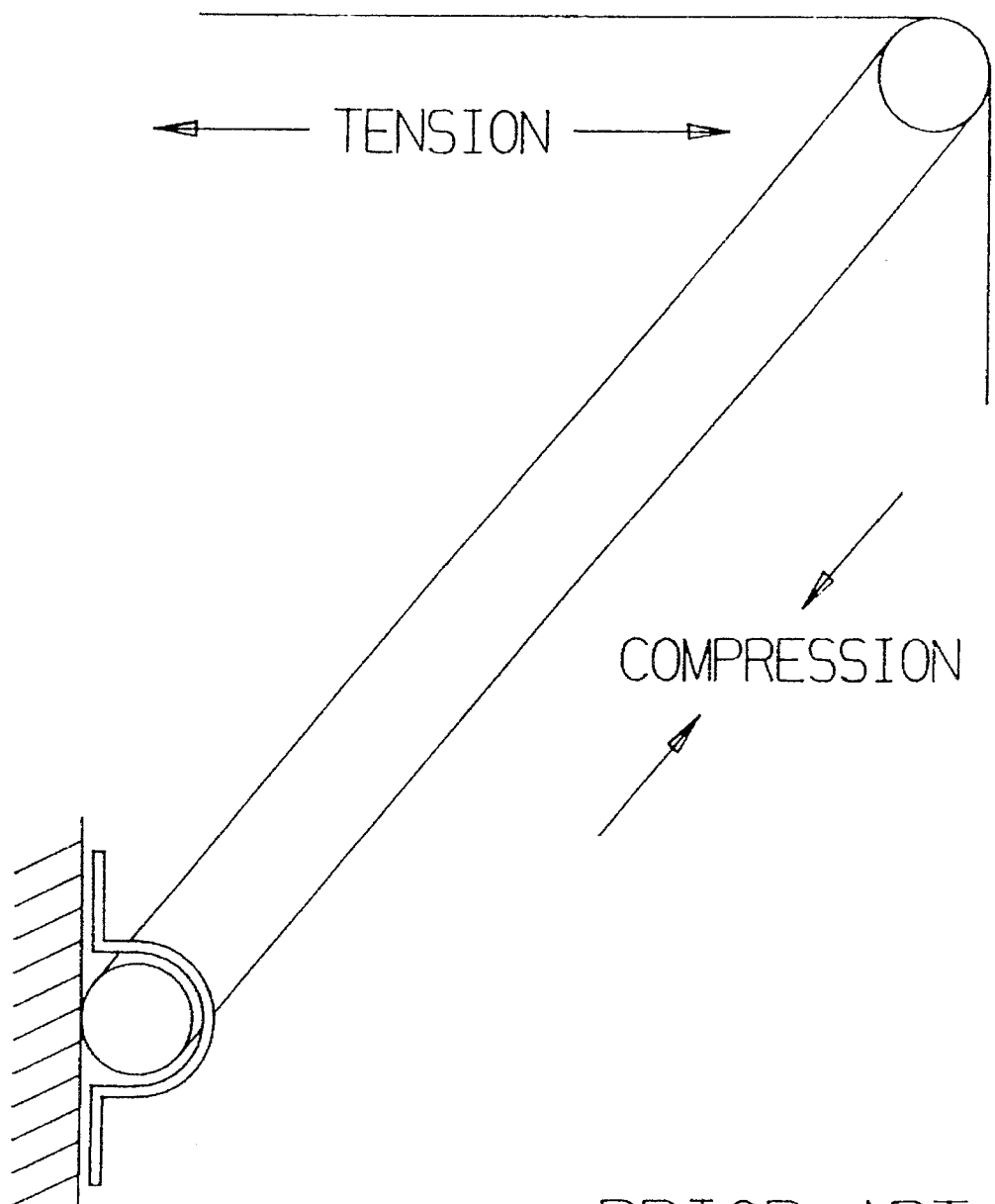
FIG. 12 shows a force diagram of a U-shaped frame leg functioning alone as a structural element.
Figure 13:
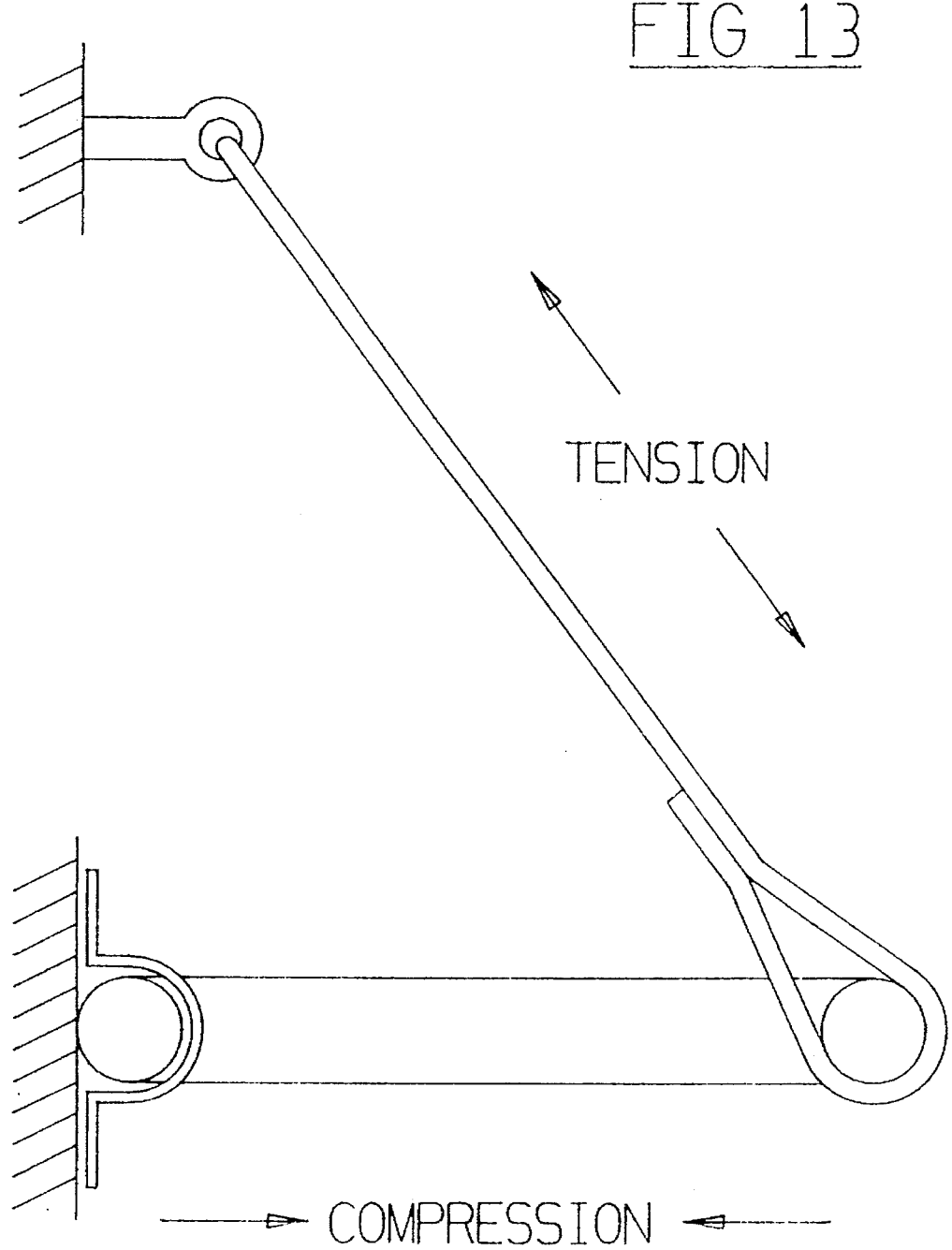
FIG. 13 shows a force diagram of a suspension wire and a flat horizontal plate functioning together as structural

DESCRIPTION OF FIGS. 12, 13, and 14—PRIOR ART

FIG. 12 shows the U-shaped frame leg discussed in the prior art. Because the bar is free to rotate at its hinge pivot, it can only react a force along its longitudinal axis. The orientation of the bar is such that this results in a compressive load along the bar's axis. Because the U-shaped frame leg is mounted at an angle, it will induce a tensile load in the fabric so the system can remain in equilibrium. This tensile load remains concentrated in the top free edge of the fabric, where the material sees the majority of its strain. This tensile load in the fabric pulls too against whatever happens to secure the fabric at its opposite end.

FIG. 13 shows the two member frame discussed in the prior art. Because it has a suspension member loaded in tension and a second rigid member loaded in compression, the frame transmits no load to fabric in a manner similar to that in FIG. 12.

Figure 14A:
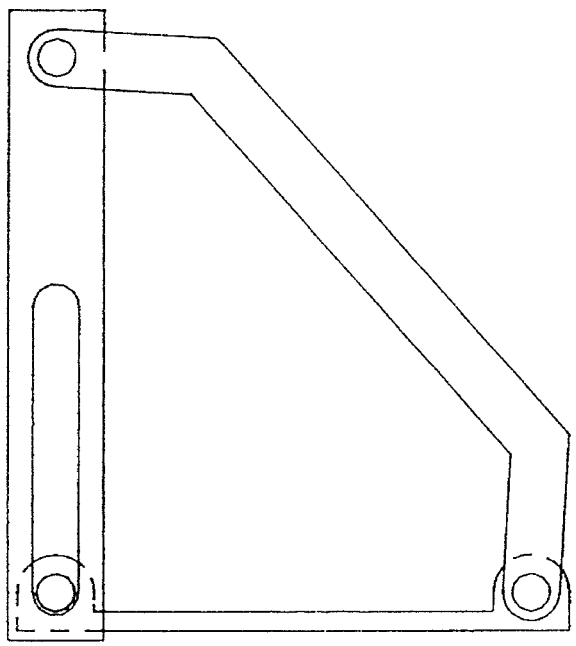
FIG. 14(a)–(b) shows a pannier carrier with a link strut and sliding bottom bracket.
Figure 14B:
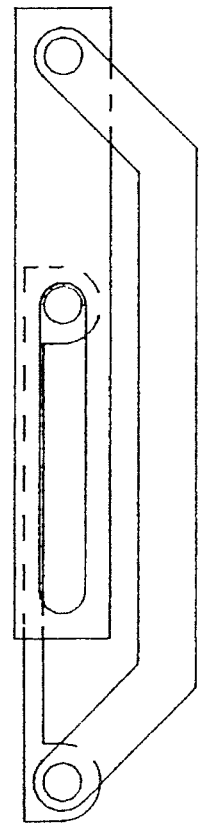

FIG. 14A and 14B show a pannier carrier discussed in the prior art in open and closed positions respectively. When the pannier is open, it supports its load in a manner similar to the two frame member of FIG. 13. When the pannier is closed, the bottom member drops lower than its open position. Furthermore as the pannier carrier of FIG. 14 closes, it tends to drop its load. In contrast, the two frame member of FIG. 13 will support its load as it closes.

OPERATION—FIGS. 1 to 11

In FIG. 1, the pair of straps 26 hold the empty, left-hand bag 22 securely folded up and closed when the Cyclist attaches both straps to the pair of fasteners on the bag's bottom 28.

When the Cyclist attaches both straps 26 on the open, right-hand bag 24 to the fastener located on each side of the bag 30 they are prevented from dangling free. This also helps to better support the fabric material on each side of the open bag.

The pannier's top attachment points are a pair of hooks 32 that hold the top rail of the bicycle rack 20 are loaded in tension by the force of the elastic loop 34 that clenches to the bottom hook-end of the bicycle rack 62. The bags are held securely to the bicycle even when it is jostling and bouncing as it is ridden by the tension pre-load on the pair hooks.

The Cyclist attaches the pannier bag in a simple two step operation: First, he hangs the pair of hooks on the back of the pannier 32 to the top rail of the bicycle rack 20, as shown in FIG. 5. Next, he slides and pulls the elastic loop 34 onto the bottom hook-end of the bicycle rack 62, as shown in FIG. 6. The bag is now securely attached to the bicycle.

To remove the bag, the Cyclist reverses these two steps. First, he slides and pulls the elastic loop 34 off the bottom hook-end of the bicycle rack 62, as shown in FIG. 6. Next, he unhangs the pair of hooks on the back of the pannier 32 from the top rail of the bicycle rack 20. The bag is now free from the bicycle as shown in FIG. 5.

In FIG. 2, the pair of strut wires 44 support the load applied to the bottom panel 36. To prevent this panel 36 from deflecting excessively, the horizontal beam 46, fitted across the panel's front edge, connects the two strut wires 44. The horizontal beam 46 substantially stiffens the bottom panel 36 and allows it to safely carry a greater load.

The integral plastic hinge 48 is a bendable corner that connects the bottom panel 36 to the back panel 38. The vertical shear load on the bottom panel 38 that is not structurally supported by the pair of strut wires 44 is carried through the integral plastic hinge 48 as a line vertical shear load into the back panel 38. This is the stiffest possible way to carry the load from the bottom panel 36 to the back panel 38. Furthermore, because the integral plastic hinge 48 has negligible transverse stiffness to side forces, no significant out-of-plane shear force is introduced to the back panel 38. Instead, these transverse forces are carried through the pair of strut wires 44.

The U-shaped rod 40 is free to pivot about a pair of hinges 42 fixed to the back panel 38.

In FIG. 3, the skeleton frame 50 connects the pannier's top attachment points, which are a pair of hooks 32; both wire strut attachment points 52; and the elastic loop 34. The stiffness and strength of these five points is critical for safely and securely holding the pannier to the bicycle. Without this skeleton frame 50, a concentrated, out-of-plane force will be applied to the back panel 38 at each of the five points, which significantly reduces the strength and stiffness of pannier in the spots where it needs it most.

In FIG. 4A, the fully extended strut wires 44 function as a check stop that determines the open position of the bottom panel 36. The U-shaped rod 40 serves to define the shape of the fabric material 54, so that the bag forms an open mouth. Neither the U-shaped rod 40 nor the fabric material 54 bears a structural load because of the structural truss created by the bottom panel 36, the back panel 38, and both the strut wires 44.

In FIG. 4B, both the U-shaped rod 40 and the bottom panel 38 pivot upwards so the Cyclist may fold up the pannier when it is empty. Although the strut wire 44 and the fabric material 54 become slack, the strut wire 44 remains inside the pannier and the U-shaped rod still serves to define the shape of the fabric material 54. Because the skeleton frame 50, top hooks 32, and elastic loop 34 function in the same manner whether the bag is folded or open, an empty pannier remains firmly attached to the bicycle. Also, the Cyclist may fold up an empty pannier more easily to carry it or store it away.

In FIG. 5, the pair of top hooks 32 support weight of the pannier and its load. Each top hook 32 is shaped so that it provides resistance as the pannier lifts off the top rail of a bicycle rack 20. This feature provides additional security for retaining the pannier to the bicycle.

In FIG. 6, the short elastic loop 34 applies a downward force directly to the bottom extension of the pannier's skeleton frame 50. This force prevents the bicycle's bumps and jolts from shaking the pannier loose from the rear bicycle rack 20.

In FIGS. 7A and 7B, the convertible cover 64 is drawn across the pannier's top and stowed out of the way inside the bag's compartment. Whether the convertible cover 64 is in place or stowed away, it is held securely in place by fasteners that attaches to the back of its three flaps. The pannier bag functions regardless whether its convertible cover 64 is on or off.

To cover the pannier's top, the Cyclist detaches the convertible cover 64 from the three fasteners inside the bag 66. He then lifts the cover out and attaches to the three fasteners outside the bag 68. To uncover the pannier's top, the Cyclist reverses this process. He detaches the cover 64 from its outside fasteners 68 and then attaches the cover to its inside fasteners 66.

The open pannier carries its load equally well with the convertible cover 64 either on or off because neither the bag's fabric material 54 or its U-shaped rod 40 supports the pannier's load. Thus, the convertible cover 64 supports no load too.

In FIG. 8, the tote strap 70 fastens to the two claps 72 that are part of the skeleton frame 50. When the bags is off the bicycle, the Cyclist may use the tote strap 70 as either a carrying handle or a shoulder strap. Because it attaches to the two clasps 72, the Cyclist can remove the tote strap 70 from the pannier when it is mounted to the bicycle. This provides convenience for when the pannier remains attached to the cycle for long periods without being removed. Otherwise, the tote strap 70 must be folded and carried inside the pannier's compartment to prevent it from being a hazard when the pannier is mounted to the bicycle.

When the Cyclist carries an unfolded and loaded pannier by the tote strap 70, the skeleton frame 50 functions in a manner similar to that when the pannier is attached to the rear rack of a bicycle. The top hooks 32 no longer support the pannier, rather the tote strap's two clasps 72 do. All other major frame members, the bottom 36 and back 38 panels, the integral plastic hinge 48, the two strut wires 44, the horizontal beam 46, and the U-shaped rod 40, function in the same manner.

Because it connects to the skeleton frame 50 alone, the tote strap 70 does not influence the pannier's ability to fold and close. Therefore, the Cyclist may carry an empty and folded pannier by its tote strap 70 too.

The spare pocket 74, also in FIG. 8, provides the Cyclist with additional convenience. Small items may be carried in it while the pannier is closed and folded up. Also when the pannier is loaded, the Cyclist may place some items apart from what the pannier's open compartment holds.

In FIG. 9, the spring loaded hook operates as an alternate to the elastic loop 34 in FIG. 6. The two guide brackets 78 prevent the slider 76 from rotating and only allow the slider 76 to move up and down. The compression spring 80 fitted between slider 76 and the guide brackets 78 provides both a downward force to the bottom extension of the pannier's skeleton frame 50 and an upward force the slider's hook blades 82.

The spring loaded hook provides the pannier with an exceptionally firm grasp at its lower attachment point. However, the advantage is lost when the pannier lacks the rigidity to resist either a transverse force or a yawing moment. Thus, he spring loaded hook proves most practical when, as in FIG. 9, it is fixed to the bottom of the skeleton frame 50, which provides the device with the inflexible mount it must have to function best.

In FIG. 10, the Cyclist attaches the spring loaded hook by pressing down the slider 76, so the hook blades 82 are positioned underneath the hook-ends of the bicycle rack 62. He then release the slider 76 and the spring 80 snaps the device into place. Later, the Cyclist can remove the spring loaded hook by pressing down the slider 76 until the hook blades 82 are completely below the hook-ends of the bicycle rack 62. He then turns pannier away from the bicycle rack 20 and releases the slider 76.

The downward force that the compression spring 80 applies to the skeleton frame 50 holds down the pannier by preloading its pair of top hooks 32. The upward force that the compression spring applies to slider 76 holds the bottom hook blades firmly to the bottom hook-end of the rear bicycle rack 62. The bottom hook blade 82 also serves hold the pannier steady so it can neither be moved transversely side-to-side nor longitudinally fore-aft. The top hooks 32 hold the pannier so it cannot vertically move down and the compression spring 80 provides the force to prevent the pannier from moving up. Because the slider 76 cannot turn inside its guide brackets 78, as shown in FIG. 9, neither can the pannier yaw in the vertical axis about the bottom hook-end of the rear bicycle rack 62.

In FIG. 11, the Cyclist has removed the pair of bottom hook blades 82 from the outside edge of the slider 76 and replaced one hook blade 82 in its slot on the slider 84. This allows the spring loaded hook to attach to those rear bicycle rack that have one bottom hook-end 62 rather than two hook-ends.

SUMMARY, RAMIFICATIONS, AND SCOPE

The invention presents a solid and secure frame for a bicycle pannier and a method of attachment suitable to its capabilities. Its frame can collapse and fold for convenience when it is empty. Furthermore, it mounts securely, yet detaches and reattaches easily to a conventional rear bicycle rack for greater convenience. Some other advantages that this pannier posses include:

It does not load the bag's fabric to support its load, rather it relies upon a separate structural frame to support its load.

It does not load the bottom and back panels in a manner that degrades their strength and stiffness.

It employs a skeleton frame that provides unity and stiffness to its method of attachment.

It employs a convertible cover that allows the pannier to function whether open topped or closed.

While the description of the invention contains many specifications, these should not be construed as limitations on the scope of the invention, but rather as an exemplification of one preferred embodiment thereof. Many other variations are possible. For example, the convertible cover may seal with a zipper; the spring-loaded bottom hook may be employ an extension spring or another elastic device; the spare pocket may me located on the outside of the pannier, a light chain or textile rope may substitute in place of the strut wire; the pannier may mount to an other suitable rack on a bicycle, or to an other type of vehicle, etc.

The scope of the invention should be determined by the appending claims and their legal equivalents, rather than by the examples given.

I claim:

1. A device for attaching a pannier receiver to a cycle rack comprising:

a bottom panel having a top side, a bottom side, a front end, and a rear end;

a back panel having a front side, a back side, a top end, a bottom end, a first front side edge, and a second front side edge;

means for hingingly connecting the rear end of the bottom panel to the bottom end of the back panel;

a pair of flexible struts; each strut having first and second ends; the first ends of each strut being attached to an opposite corner of the back panel at the top end; the second ends of each strut being attached to an opposite corner of the bottom panel at the front end;

a U-shaped rod for engaging the pannier receiver having first and second ends; the first end of the U-shaped rod being hingingly attached to the first front side edge of the back panel and the second end of the U-shaped rod being hingingly attached to the second front side edge;

means attached to the back side of the back panel for attaching the device to the cycle rack.

* * * * *